United States Patent
Gunasekara et al.

(10) Patent No.: US 8,503,886 B1
(45) Date of Patent: Aug. 6, 2013

(54) SYSTEMS AND METHODS FOR VISUAL LIGHT COMMUNICATION

(75) Inventors: Don Gunasekara, Reston, VA (US); Tom Wilson, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 1300 days.

(21) Appl. No.: 11/968,824

(22) Filed: Jan. 3, 2008

(51) Int. Cl.
*H04B 10/00* (2006.01)
*H04B 10/02* (2006.01)

(52) U.S. Cl.
USPC ............ 398/172; 398/115; 398/118; 398/128

(58) Field of Classification Search
USPC ................. 398/115, 104, 105, 168–173, 175, 398/176, 180, 116, 117, 118–131, 140
See application file for complete search history.

(56) References Cited

U.S. PATENT DOCUMENTS

| | | | | |
|---|---|---|---|---|
| 5,424,859 A * | 6/1995 | Uehara et al. | .................. | 398/127 |
| 5,838,116 A * | 11/1998 | Katyl et al. | .................... | 315/307 |
| 6,041,216 A * | 3/2000 | Rose et al. | ......................... | 455/9 |
| 6,816,455 B2 * | 11/2004 | Goldberg et al. | ............. | 370/230 |
| 6,865,347 B2 * | 3/2005 | Perkins et al. | ................. | 398/172 |
| 7,352,972 B2 * | 4/2008 | Franklin | ......................... | 398/172 |
| 2004/0096222 A1 * | 5/2004 | Cagenius | ....................... | 398/115 |
| 2004/0203911 A1 * | 10/2004 | Masuda et al. | .............. | 455/456.1 |
| 2006/0067707 A1 | 3/2006 | Maniam et al. | | |
| 2007/0147843 A1 | 6/2007 | Fujiwara | | |
| 2007/0160373 A1 * | 7/2007 | Biegelsen et al. | .............. | 398/118 |
| 2009/0073918 A1 * | 3/2009 | Conforto et al. | .............. | 370/316 |

* cited by examiner

*Primary Examiner* — Danny Leung
*Assistant Examiner* — Daniel Dobson

(57) ABSTRACT

Systems and methods for visual light communication are provided. The system can include a gateway arranged to convert radio frequency communications into visual light communication signals and an active light relay arranged to exchange visual light communication signals with the gateway. The system also includes a passive light relay arranged to exchange visual light communication signals with the active light relay and a communication device arranged to exchange visual light communication signals with one of the active light relay of the passive light relay.

18 Claims, 10 Drawing Sheets

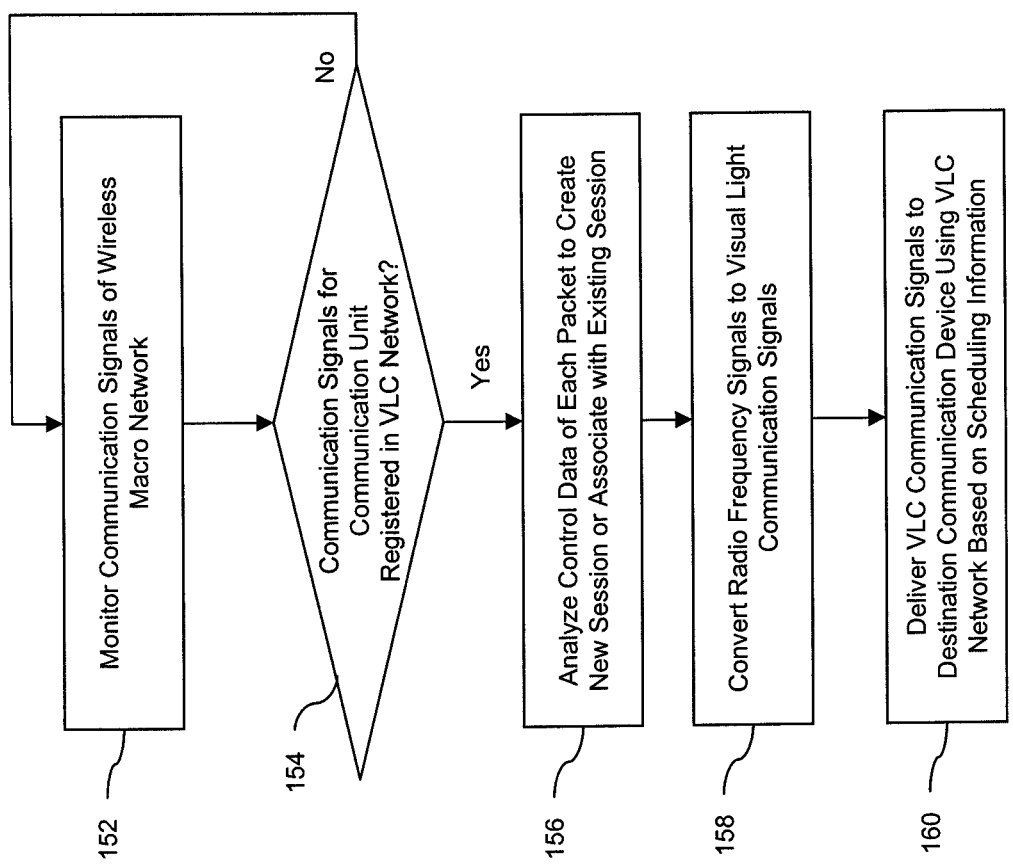

SYSTEMS AND METHODS FOR VISUAL LIGHT COMMUNICATION

BACKGROUND OF THE INVENTION

Communications can be performed using both wired and wireless communication media. Each media provides a variety of different mechanisms for carrying communications. For example, wired communications can travel over conventional twisted pair wires, category 5 or 6 wires or fiber optic cables. Wireless communications can be performed using radio frequencies, infrared frequencies, sonar and/or the like.

SUMMARY OF THE INVENTION

Exemplary embodiments of the present invention are directed to systems and methods of performing communications using visual light. The communications can originate from a wired or wireless network, be converted into visual light, and then carried over a visual light communication network. Communications from the visual light communication network can be provided to a wired or wireless network.

An exemplary communication system includes a gateway arranged to convert radio frequency communications into visual light communication signals and an active light relay arranged to exchange visual light communication signals with the gateway. The system also includes a passive light relay arranged to exchange visual light communication signals with the active light relay and a communication device arranged to exchange visual light communication signals with one of the active light relay of the passive light relay.

An exemplary method involves receiving radio frequency communication signals, converting the received radio frequency communication signals into visual light communication signals and transmitting the visual light communication signals.

Other objects, advantages and novel features of the present invention will become apparent from the following detailed description of the invention when considered in conjunction with the accompanying drawings.

BRIEF DESCRIPTION OF THE DRAWING FIGURES

FIG. 1C is a flow diagram of an exemplary method in accordance with the present invention;

DETAILED DESCRIPTION OF THE PREFERRED EMBODIMENTS

Figure 1A:
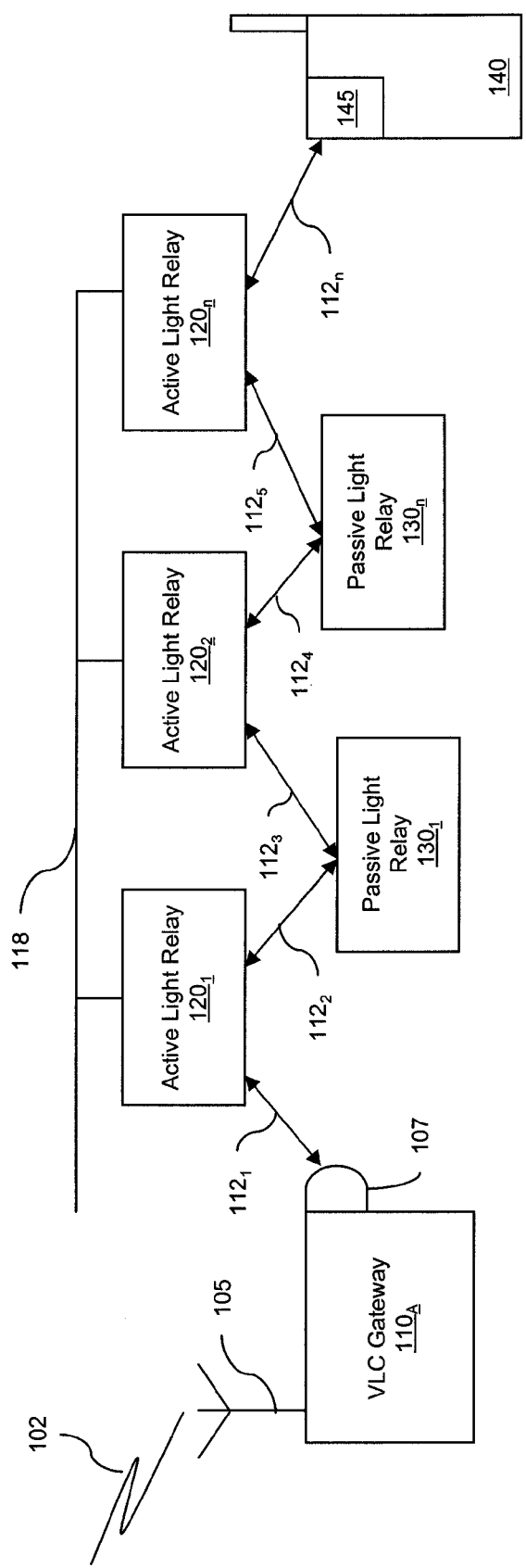
FIGS. 1A and 1B are block diagrams of an exemplary system in accordance with the present invention.

FIG. 1A is a block diagram of an exemplary system in accordance with the present invention. The system includes visual light communications (VLC) gateway $110_A$, one or more active light relays $120_1$-$120_n$, one or more passive light relays $130_1$-$130_n$ and one or more communication devices 140, the detailed operation of each of these components will be described below in connection with FIGS. 2A-5.

VLC gateway $110_A$ is coupled to a wireless macro network (not illustrated) by an air interface and exchanges communication signals using radio frequencies. VLC gateway $110_A$ is also coupled to active light relay $120_1$ by communication link $112_1$ and exchanges communication signals using visual light. Specifically, visual light is modulated based on the communication signals, and active light relay can demodulate the visual light in order to recover the communication signals. The visual light can be modulated using a high frequency modulation such that the modulation is not evident to the human eye or the visual light can be modulated in a manner that is visible to the human eye using a low frequency modulation.

Each of the active light relays $120_1$-$120_n$ can be coupled to powerline 118. Moreover, each of the relays can include a battery for operation in the event of a failure of powerline 118. In addition to providing the communication functionality described in more detail below, each of the active light relays $120_1$-$120_n$ can also provide ambient light for illuminating an area surrounding the relay.

Figure 1B:
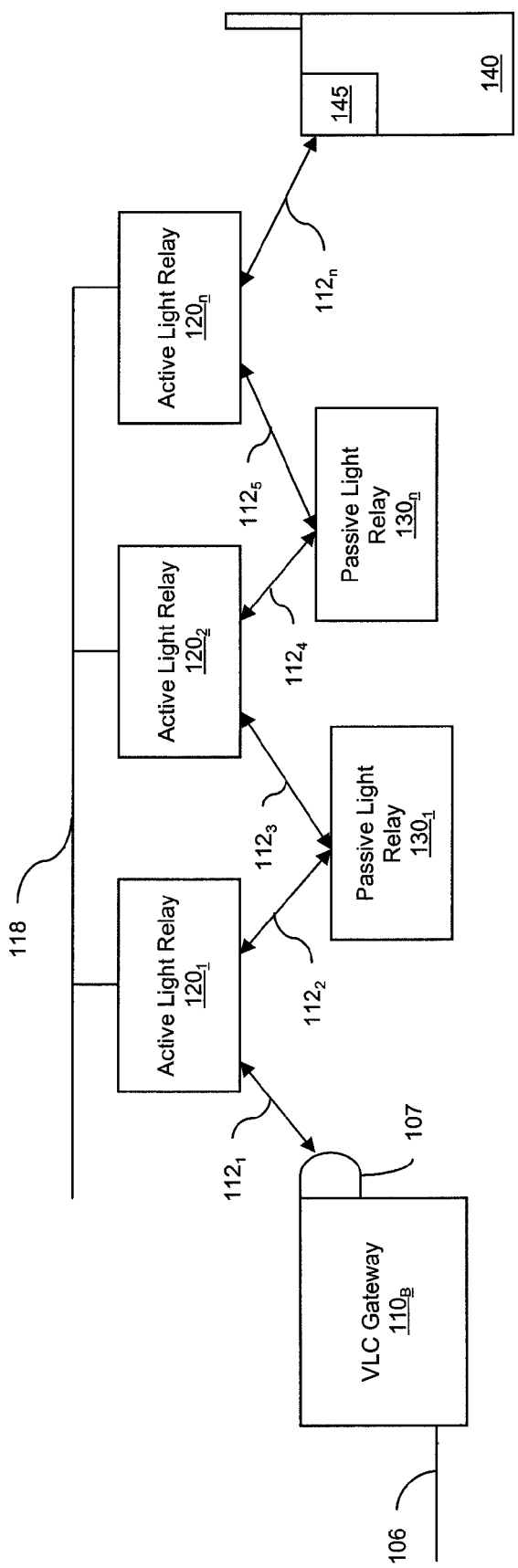

The system of FIG. 1B is similar to that of FIG. 1A except that the system includes gateway $110_B$, which is coupled to a wired communication network (not illustrated) by communication line 106, whereas gateway $110_A$ of FIG. 1A is coupled to a wireless macro network by a wireless air interface. It should be recognized that a gateway can be provided which can be coupled to either or both of a wired and/or wireless communication network.

Referring now to both FIGS. 1A and 1C, VLC gateway $110_A$ monitors communication signals 102 of a wireless macro network (not illustrated), and determines whether any of the communications signals are intended for a communication unit registered in the VLC network (steps 152 and 154). When there are no communication signals for communication units registered in the VLC network ("No" path out of decision step 154), then VLC gateway $110_A$ continues to monitor communication signals of the wireless macro network (step 152).

Registering communication devices as being supported by the visual light communication network can be performed using any number of different techniques. For example, the wireless macro network can store the registration information in a home location register indicating that the communication devices are supported by the visual light communication network, and incoming communications for one of the communication devices will be forwarded to VLC gateway $110_A$. Alternatively, the wireless macro network can store the registration information in a home location register indicating that the communication devices are supported by a base station that is in radio frequency range of VLC gateway $110_A$. Incoming communications for one of the communication devices will be forwarded to the base station, which will transmit the signals to VLC gateway $110_A$. In either case, VLC gateway $110_A$ can include registration logic to maintain information regarding the communication devices supported by the visual light communication network.

When VLC gateway $110_A$ receives communication signals that are intended for communication units registered in the VLC network ("Yes" path out of decision step 154), then the gateway analyzes control data of each packet in order to create a new session or associate the packet with an existing session (step 156). VLC gateway $110_A$ then converts the radio frequency signals into visual light communication signals and delivers the visual light communication signals to the intended destination communication device by way of the VLC network based on scheduling information (steps 158 and 160). The scheduling information is employed to provide differentiated quality of service (QoS) for communication devices supported by the visual light communication network.

Delivery of communication signals from outside of the visual light communication network begins with VLC gateway $110_A$ modulating the communication signals and transmitting visual light communication signals over communication link $112_1$ by light source/sensor 107 to active light relay $120_1$, which in turn transmits the signals to passive light relay $130_1$ over communication link $112_2$. Passive light relay $130_1$ transmits the signals to active light relay $120_2$ over communication link $112_3$, which in turn transmits the signals to passive light relay $130_n$ over communication link $112_4$. Passive light relay $130_n$ transmits the signals over communication link $112_5$ to active light relay $120_n$, which in turn transmits the signals over communication link $112_n$ to communication unit 140. Communication unit 140 receives the communication signals using light source/sensor 145. Communications originating from communication unit 140 will travel over the reverse of the path described above. Although FIGS. 1A and 1B illustrate a communication device exchanging communication signals directly with an active light relay, the communication device can also exchange communication signals directly with one of the passive light relays and/or the VLC gateway.

Figure 2A:
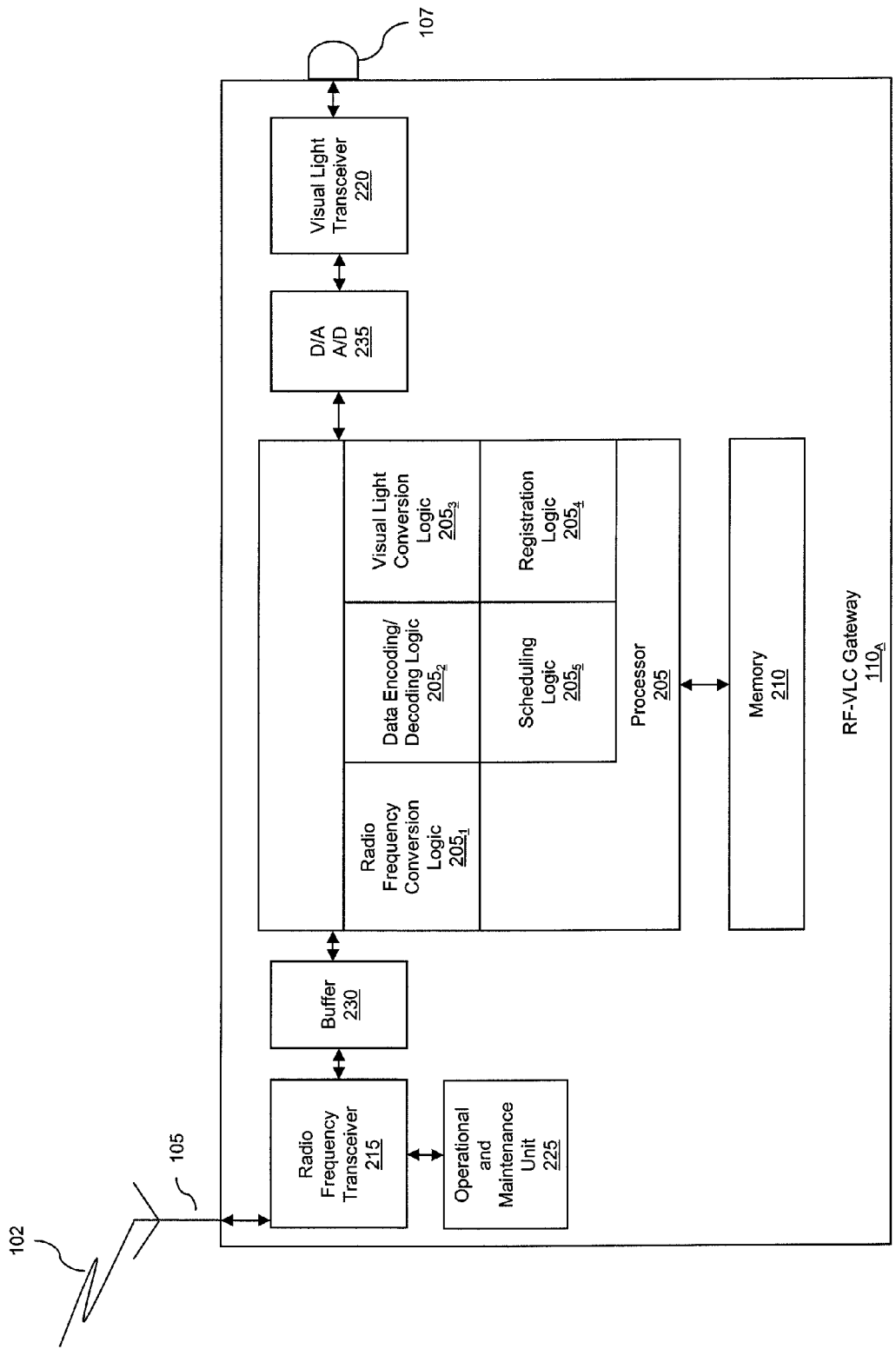
FIG. 2A is a block diagram of an exemplary gateway in accordance with the present invention.

FIG. 2A is a block diagram of an exemplary gateway in accordance with the present invention. Gateway $110_A$ includes antenna 105 that receives radio frequency signals 102 from a wireless macro network (not illustrated) and provides the signals to radio frequency transceiver 215. Radio frequency transceiver includes the functionality for communicating with the wireless macro network, and provides received communication signals to buffer 230, which in turn provides the signals to processor 205.

Processor 205 includes logic $205_1$-$205_5$, and is coupled to memory 210. Processor 205 can be any type of processor, such as a microprocessor, field programmable gate array (FPGA) and/or an application specific integrated circuit (ASIC). When processor 205 is a microprocessor then logic $205_1$-$205_5$ can be processor-executable code loaded from memory 210. Communication signals from the wireless macro network are provided by buffer 230 to processor 205. Logic $205_1$ converts the received radio frequency signals into baseband signals, and logic $205_2$ decodes the baseband signals. The decoded baseband signals are then converted into visual light communication signals by logic $205_3$, and provided to digital-to-analog/analog to digital (D/A-A/D) converter 235. D/A-A/D converter 235 provides the signals to visual light transceiver 220, which then transmits the visual light communication signals using light source/sensor 107. Light source/sensor 107 can include a light source that can be, for example, a light emitting diode, and a separate light sensor, such as a photo diode array.

Visual light communication signals received by light source/sensor 107 are converted to baseband signals by logic $205_3$, encoded by logic $205_2$ and converted to radio frequency signals by logic $205_1$. Processor 205 then provides the signals to buffer 230, which can then transmit the signals to the wireless macro network using radio frequency transceiver 215 and antenna 105.

Processor 205 also includes registration logic $205_4$ that controls registration of communication devices in the VLC network, and stores the registration information in memory 210. Alternatively, the registration information can be stored in a separate component coupled to VLC gateway $110_A$.

Processor 205 further includes scheduling logic $205_5$ that controls the scheduling of packets based on information received from operational and maintenance unit 225. Operational and maintenance unit 225 manages the powering on and off of the gateway, clearing the gateway memory, providing status updates to a central controller (not illustrated) of the wireless macro network or a central controller located above ground from the visual light communication network.

Figure 2B:
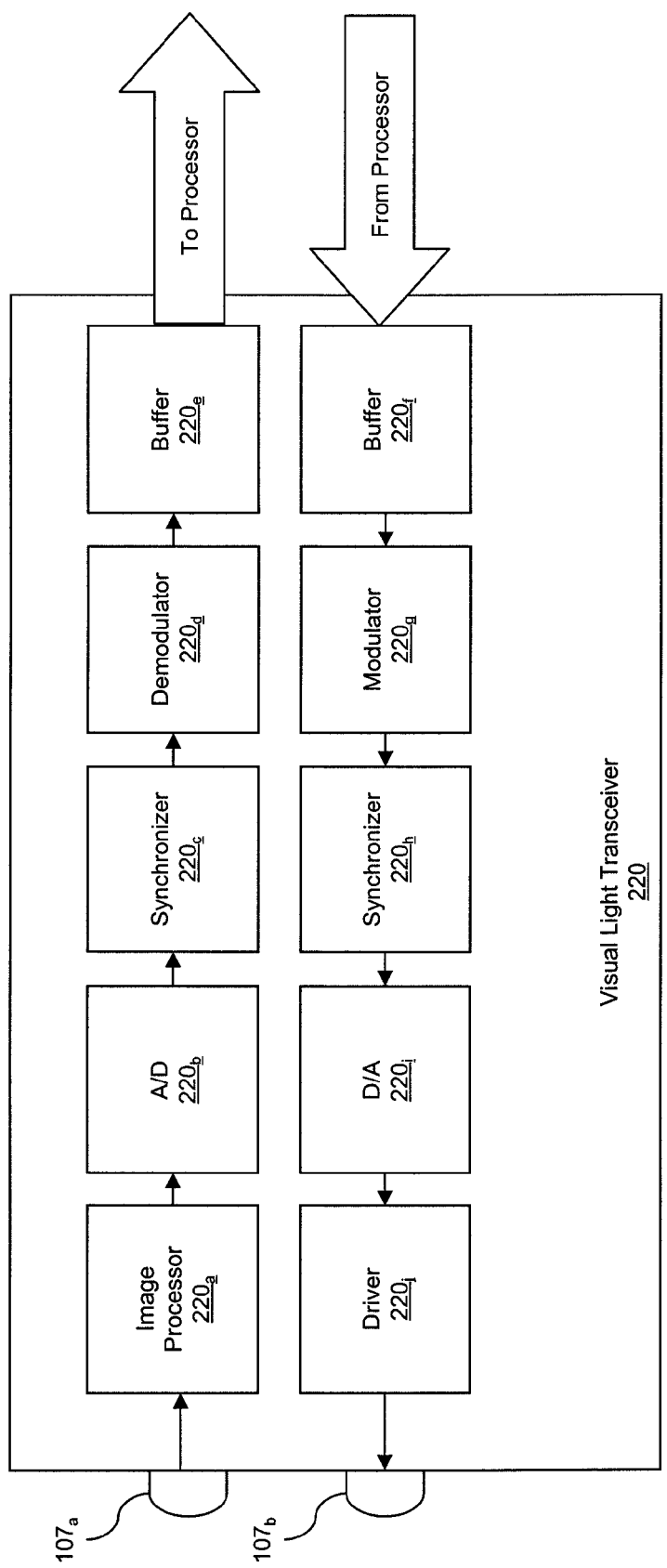
FIG. 2B is a block diagram of an exemplary visual light transceiver in accordance with the present invention.

FIG. 2B is a block diagram of an exemplary visual light transceiver in accordance with the present invention. The visual light transceiver of FIG. 2B is arranged to receive visual light communication signals and provide those signal to processor 205, and receive signals from processor 205 for transmission within the visual light communication network. Specifically, visual light communication signals received by light sensor $107_a$ are provided to image processor $220_a$, and converted from analog to digital by block $220_b$. Block $220_c$ synchronizes the signals, and block $220_d$ demodulates the received signals and supplies the signals to buffer $220_e$, which in turn provides the signals to processor 205. The synchronization of signals is performed in order to recover data from the received signal, where the waveforms carrying the data across the air interface may have been distorted during transmission. Synchronization can be performed using any number of different techniques, including detecting framing bits that are included with the transmitted signal, using training sequences that are included with the transmitted signal, and/or the like.

When the VLC gateway is coupled to a wired communication network, such as gateway $110_B$, antenna 105 and transceiver 215 can be replaced with equivalent components for communicating with a wired network.

Signals received from processor 205 are provided to buffer $220_f$, which provides the signals to modulator $220_g$. The modulated signals are then synchronized by block $220_h$, converted from analog to digital by block $220_i$, and output by light source $107_b$, which is controlled by driver $220_j$.

Figure 3:
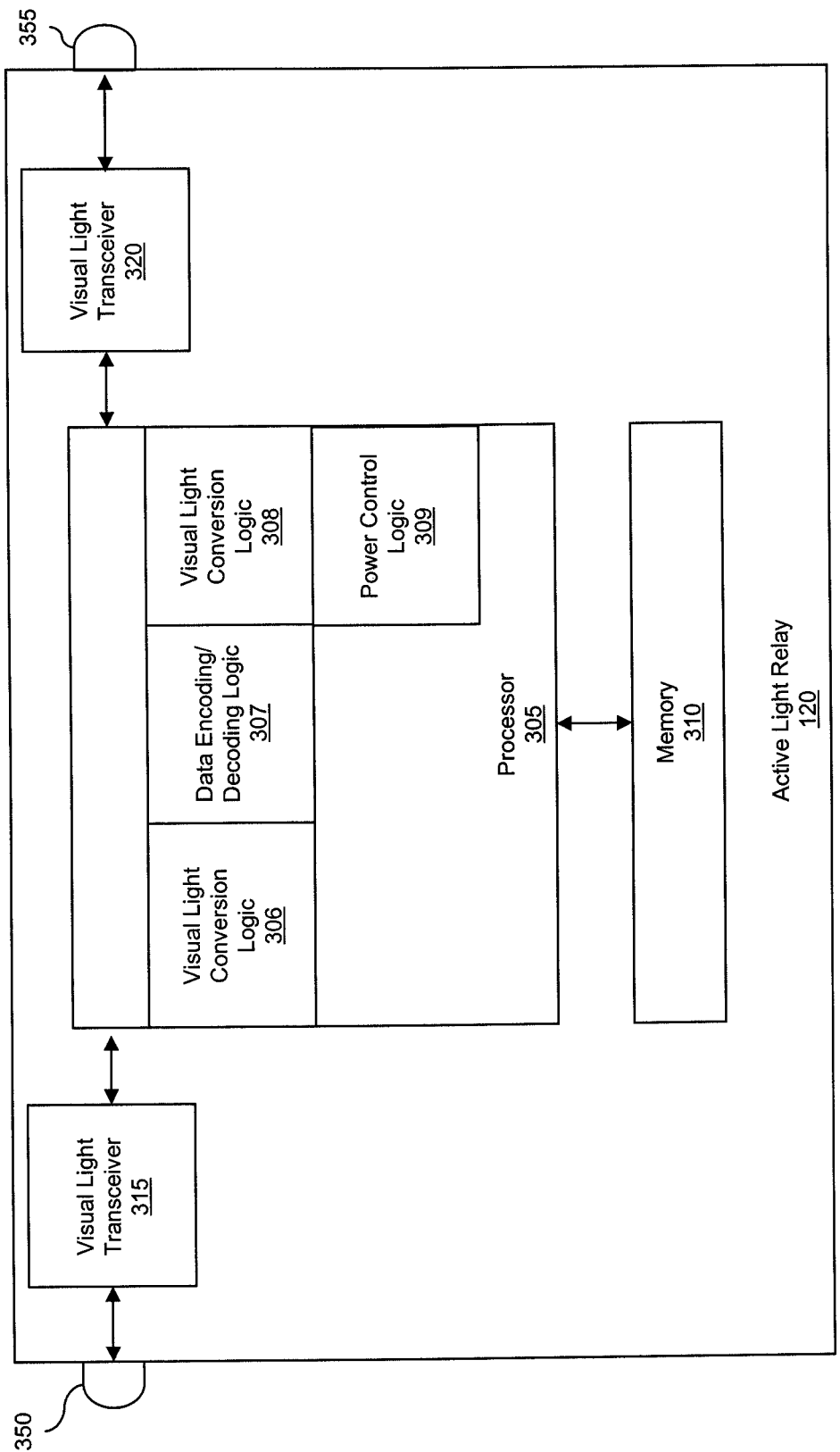
FIG. 3 is a block diagram of an exemplary active light relay in accordance with the present invention.

FIG. 3 is a block diagram of an exemplary active light relay in accordance with the present invention. The active light relay 120 includes a processor coupled between memory 310 and visual light transceivers 315 and 320. Processor 305 includes logic 306-309. Processor 305 can be any type of processor, such as a microprocessor, field programmable gate array (FPGA) and/or an application specific integrated circuit (ASIC). When processor 305 is a microprocessor then logic 306-309 can be processor-executable code loaded from memory 310.

Visual light transceivers 315 and 320 each include similar components to those illustrated in FIG. 2B. When source/sensor 350 receives visual light, the light is passed to visual light transceiver 315, which converts the light into a digital format, and synchronizes and demodulates the light signal. The demodulated signal is then passed to processor 305. Logic 306 converts the demodulated digital signal into a baseband signal, logic 307 decodes the baseband signal, and logic 308 converts the signal back into a visual light communication signal. This signal is then passed to visual light transceiver 320, which transmits the signal using light source/sensor 355. Power control logic 309 detects whether the relay is receiving power from the powerline, and charges the batteries (not illustrated) of the relay when power is received. Logic 309 can also determine the reason for a shutdown, and will activate the batteries only when there is a valid reason for the shutdown. In certain sites, such as underground mines, lighting systems must be shutdown during hazardous situations in order to avoid damage and/or explosions. In such situations a database can be employed to determine whether to employ battery power instead of power from the powerline. The detection of hazardous situations can be performed using a variety of techniques, including sensors integrated with the system and/or separate sensors. The sensors can update the database when a hazardous situation is detected or when a break is detected in the powerline. In these cases, logic 309 consults the database to determine whether to switch the system into an ON state by using the battery (such as when the powerline is broken) or to completely shutdown the system (such as when flammable or toxic gasses are detected).

Although FIG. 3 illustrates two light sources/sensors 350 and 355 and two visual light transceivers 315 and 320, the active light relay 120 can include a single light source/sensor and a single visual light transceiver.

Figure 4:
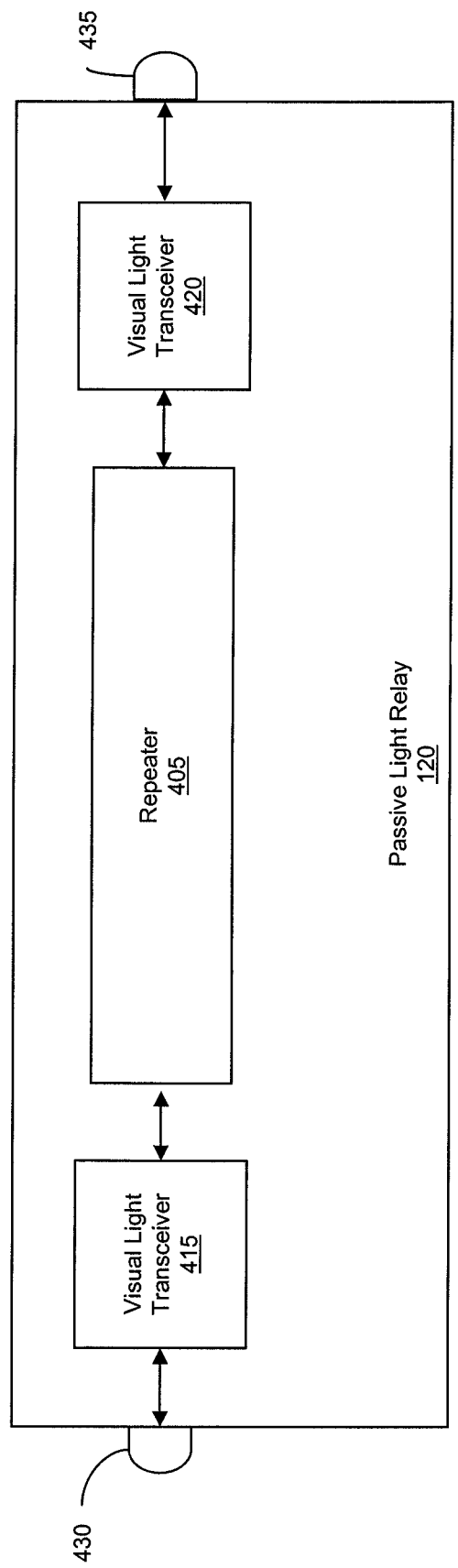
FIG. 4 is a block diagram of an exemplary passive light relay in accordance with the present invention.

FIG. 4 is a block diagram of an exemplary passive light relay in accordance with the present invention. The passive light relay 120 includes a repeater 405 coupled between two visual light transceivers 415 and 420. Visual light transceiver 415 is also coupled to light source/sensor 430, and visual light transceiver 420 is also coupled to light source/sensor 435.

Visual light transceivers 415 and 420 can each be arranged in the manner illustrated in FIG. 2B. Accordingly, unlike the active light relay, the passive light relay does not process the received visual light communication signals, but instead merely repeats the received signals. Repeater 405 can, if necessary, increase the level of the visual light communication signal prior to repeating it to the next network component. In addition, or as an alternative, to the passive light relay illustrated in FIG. 4, a passive light relay that consists of only one or more mirrors can be employed. The mirrors are arranged to receive visual light communication signals from one network component and reflect the signals to the next network component.

Figure 5A:
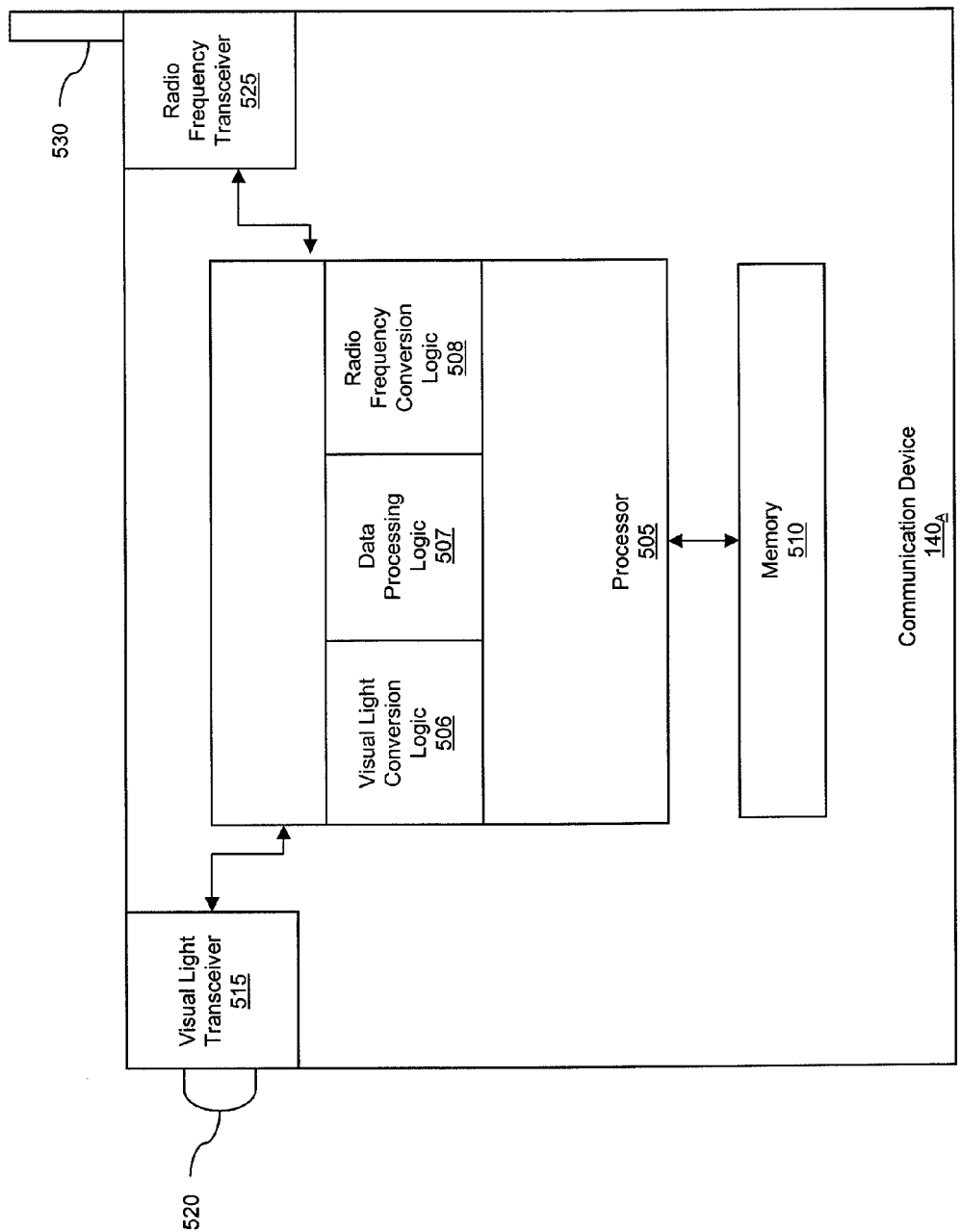
FIGS. 5A and 5B are block diagrams of exemplary communication devices in accordance with the present invention.
Figure 5B:
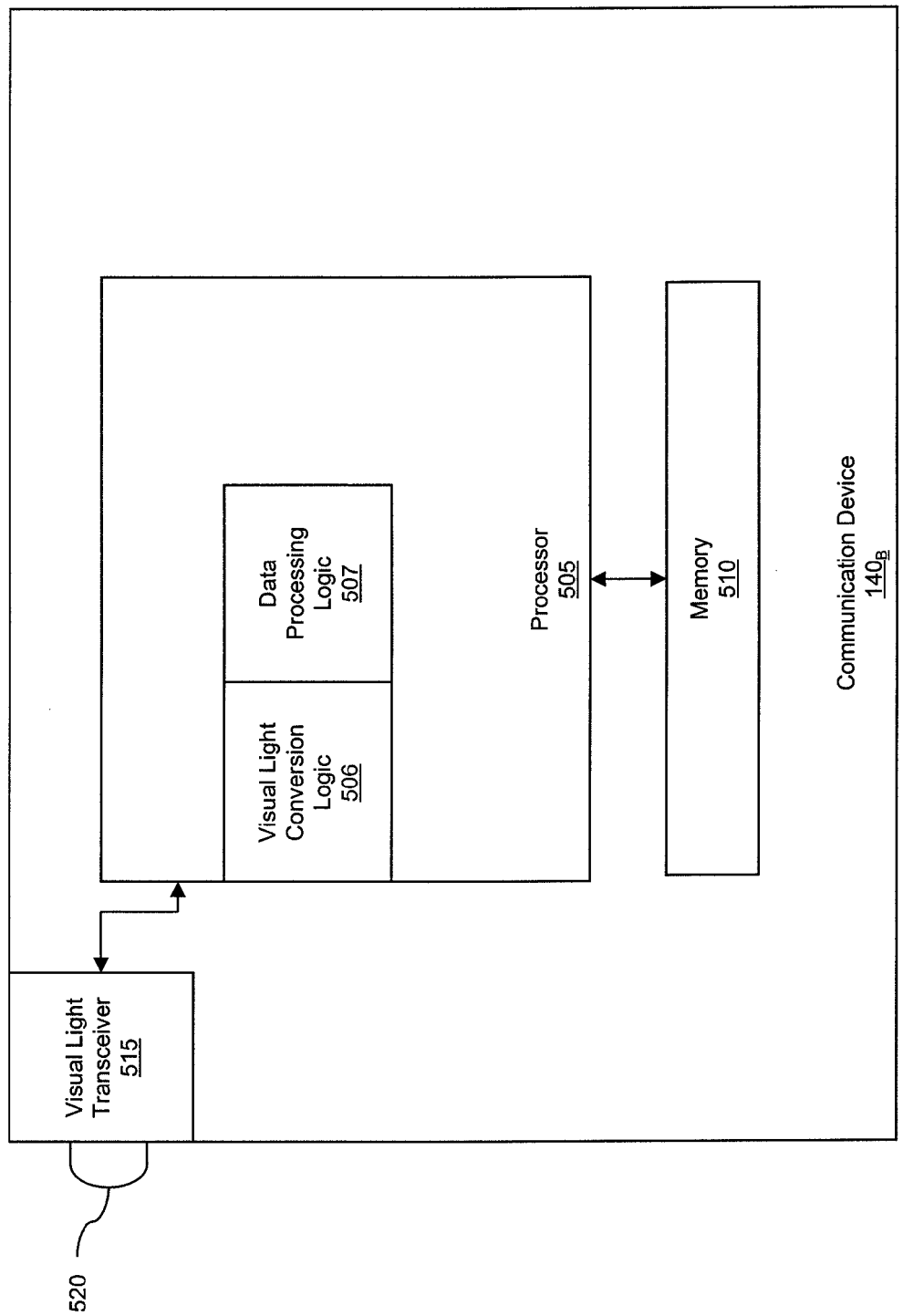

FIGS. 5A and 5B are block diagrams of exemplary communication devices in accordance with the present invention. The communication device 140$_A$ of FIG. 5A is capable of communicating using visual light and/or radio frequencies, whereas the communication device 140$_B$ is capable of communicating using only visual light. Specifically, communication device 140$_A$ includes a light source/sensor 520 coupled to a visual light transceiver 515, which includes similar components to those illustrated in FIG. 2B. Visual light transceiver 515 is coupled to processor 505, which is also coupled to memory 510. For radio frequency communications, antenna 530 is coupled to radio frequency transceiver 525, which in turn is coupled to processor 505. In contrast, communication device 140$_B$ of FIG. 5B does not include antenna 530 and radio frequency transceiver 525.

Processor 505 of communication device 140$_A$ includes visual light conversion logic 506 for processing visual light signals received by visual light transceiver 515, radio frequency logic 508 for processing signals received by radio frequency transceiver 525, and logic 507 for processing the decoded data provided by logic 506 and/or 508. Communication device 140$_B$ can be embodied in a variety of different packaging. For example, communication device 140$_B$ can be a component of a head lamp, such as those used by miners.

Figure 6:
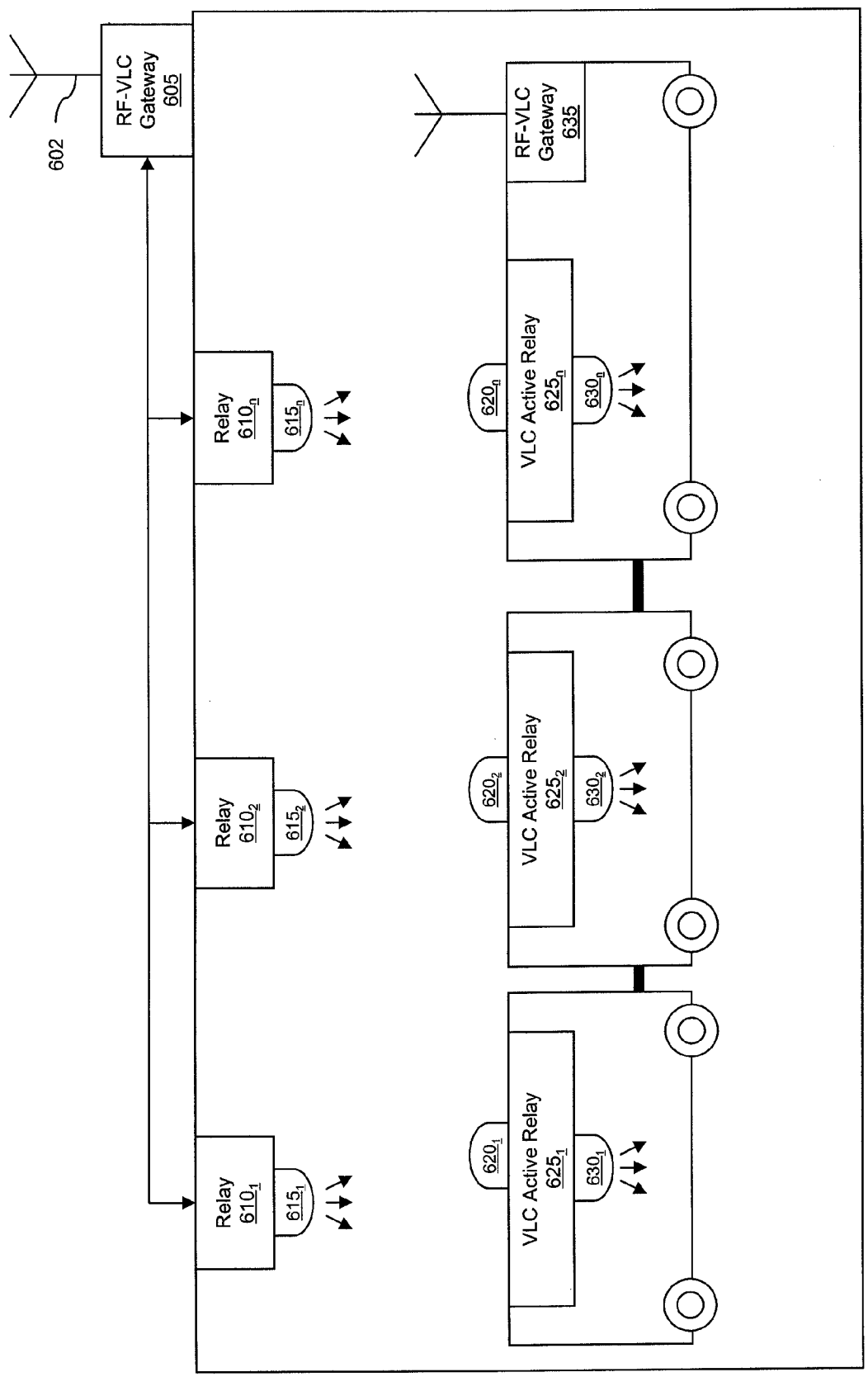
FIG. 6 is a block diagram of an exemplary system in accordance with the present invention.

FIG. 6 is a block diagram of an exemplary system in accordance with the present invention. The system illustrated in FIG. 6 is for a train system, such as a subway system. The system includes RF-VLC gateway 605, which is arranged such that at least antenna 602 is located outside of the train tunnel in order to receive radio frequency signals from a wireless macro network. The RF-VLC gateway 605 is arranged in the manner described above in connection with FIG. 2A. In the system of FIG. 6 RF-VLC gateway 605 can control handover between the visual light communication network and the wireless macro network, perform authentication and authorization functions for communication devices in the visual light communication network, and can distribute communication signals received from the wireless macro network to communication devices located within the trains using various relays.

Specifically, RF-VLC gateway 605 is coupled to relays 610$_1$-610$_n$ in order to distribute the visual light communication signals to communication devices located within the train. This coupling can be made by way of broadband over powerline (BPL) technology, using optical fibers, twisted pair wire and/or the like. Relays 610$_1$-610$_n$ can be active relays, such as that described above in connection with FIG. 3, or passive relays, such as that described above in connection with FIG. 4. Each of relays 610$_1$-610$_n$ includes a light source/sensor 615$_1$-615$_n$, which are arranged to exchange visual light communication signals with light sources/sensors 620$_1$-620$_n$, which are coupled to an outside portion of at least one of the train cars. Light sources/sensors 620$_1$-620$_n$ are in turn coupled to VLC active relays 625$_1$-625$_n$.

Each active relay is coupled to a light transceiver 630$_1$-630$_n$, in order to exchange communication signals with communication devices located within each of the train cars. One of the train cars can also include a RF-VLC gateway 640 for receiving radio frequency signals when the train is outside of a tunnel and distributing the signals as visual light communication signals to the VLC active relays 625$_1$-625$_n$, which are in turn coupled to light sources/sensors 630$_1$-630$_n$. VLC active relays 625$_1$-625$_n$ can be hardwired to connection ports within the train, and communication devices located within the train can be coupled to the connection ports for exchanging communication signals within the visual light communication network and with communication devices located outside of the network. In this case, light sources/sensors 630$_1$-630$_n$ can be omitted.

Although FIG. 6 illustrates each car including a VLC active relay, the entire train can include a single relay, which then distributes the visual light communication signals to light sources/sensors 630$_1$-630$_n$. Moreover, the particular arrangement of the light sources/sensors 615$_1$-615$_n$ relative to light sources/sensors 630$_1$-630$_n$ is merely exemplary, and these elements can be arranged in a different manner than is illustrated. For example, light sources/sensors 615$_1$-615$_n$ can be mounted on the walls of the train tunnel and light sources/sensors 630$_1$-630$_n$ can be arranged on the outside side walls of the train.

Although FIGS. 1C and 6 have been described in connection with a gateway that includes a radio frequency capability, these methods and systems can also employ a gateway that is coupled to a wired communication system, such as gateway 110$_B$ illustrated in FIG. 1B.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A visual light communication system, comprising:
a gateway arranged to convert radio frequency communications received from a wireless network over an air interface for a communication device into visual light communication signals by downconverting the radio frequency communications to baseband signals, decoding the baseband signals, and modulating the baseband signals using visual light;
an active light relay arranged to exchange visual light communication signals with the gateway;

a passive light relay arranged to exchange visual light communication signals with the active light relay; and a communication device arranged to exchange visual light communication signals with one of the active light relay or the passive light relay, wherein the gateway is further configured to control a handover of the communication device between the visual light communication system and a wireless macro network, and wherein the gateway is further configured to analyze control data of each of a plurality of packets of the received radio frequency communications, and based on the analyzed control data, when a communication session exists between the gateway and the communication device, associate the received packets with the existing communication session, and when a communication session does not exist between the gateway and the communication device, create a new communication session between the gateway and the communication device.

2. The communication system of claim 1, wherein the gateway includes a light source which produces visual light that illuminates surroundings of the gateway and transmits the visual light communication signals.

3. The communication system of claim 1, wherein the active light relay includes a light source which produces visual light that illuminates surroundings of the active light relay and transmits the visual light communication signals.

4. The communication system of claim 1, wherein the system is arranged in a tunnel.

5. The communication system of claim 4, wherein the tunnel is an underground mine.

6. The communication system of claim 4, comprising:
a train, wherein gateway is arranged on an outside portion of the train, and the active light relay, passive light relay and communication device are arranged inside the train.

7. The communication system of claim 4, comprising:
a train, wherein gateway is arranged on a perimeter of the tunnel, the active light relay is arranged on an outside of the train, and the communication device are arranged inside the train.

8. The communication system of claim 1, wherein the gateway comprises:
a radio frequency transceiver arranged to receive radio frequency communications;
a visual light transceiver arranged to transmit visual light communication signals; and
a processor, coupled between the radio frequency transceiver and the visual light transceiver, arranged to convert communications between radio frequencies and visual light.

9. The communication system of claim 8, wherein the processor of the gateway comprises:
radio frequency conversion logic to convert radio frequency signals into baseband signals;
decoding logic to decode the baseband signals; and
visual light conversion logic to convert the decoded baseband signals into visual light signals.

10. The communication system of claim 1, wherein the active light relay comprises:
a visual light transceiver arranged to exchange visual light communication signals with one of the gateway and the passive light relay; and a processor, coupled to the visual light transceiver, arranged to provide visual light communication signals received from one of the gateway or passive light relay to the other of the gateway or passive light relay.

11. The communication system of claim 10, wherein the visual light transceiver includes a first visual light transceiver to exchange visual light communication signals with the gateway and a second visual light transceiver to exchange visual light communication signals with the passive relay.

12. The communication system of claim 10, wherein the processor of the active light relay comprises:
visual light conversion logic to convert visual light communication signals into baseband signals; and
decoding logic to decode the baseband signals, wherein the decoded baseband signals are encoded and provided to the visual light conversion logic for conversion into visual light communication signals.

13. The communication system of claim 1, wherein the passive light relay comprises:
a first and second visual light transceiver; and
a repeater coupling the first visual light transceiver to the second visual light transceiver.

14. The communication system of claim 13, wherein the repeater is a mirror.

15. The communication system of claim 1, wherein the communication device includes a component that is mountable to a hat.

16. The communication system of claim 1, wherein the communication device comprises:
a visual light communications transceiver;
a radio frequency transceiver; and
a processor coupled to the visual light transceiver and the radio frequency transceiver.

17. A method of exchanging communication signals, the method comprising the acts of:
receiving at a gateway radio frequency communication signals from a wireless network over an air interface for a communication device, wherein the gateway is configured to control a handover of the communication device between the gateway and the wireless network;
analyzing control data of each of a plurality of packets of the received radio frequency communications, and based on the analyzed control data,
when a communication session exists between the gateway and the communication device, associating the received packets with the existing communication session, and
when a communication session does not exist between the gateway and the communication device, creating a new communication session between the gateway and the communication device;
converting the received radio frequency communication signals into visual light communication signals;
transmitting the visual light communication signals; and
determining that the received radio frequency signals are intended for a communication device supported by a visual light communication network.

18. The method of claim 17, wherein the act of converting comprises the acts of:
downconverting the radio frequency signals to baseband signals;
decoding the baseband signals; and
modulating the baseband signals using visual light.

* * * * *